United States Patent [19]

Monteiro

[11] 4,281,343
[45] Jul. 28, 1981

[54] UNDERWATER VIDEO CAMERA HOUSING

[76] Inventor: George Monteiro, 3338 Devon Rd., Miami, Fla. 33133

[21] Appl. No.: 144,412

[22] Filed: Apr. 28, 1980

[51] Int. Cl.³ .............................................. H04N 7/18
[52] U.S. Cl. ...................................... 358/99; 354/64; 358/229
[58] Field of Search ..................... 358/99, 229; 354/64

[56]  References Cited
U.S. PATENT DOCUMENTS

| 3,484,317 | 12/1969 | Dickerson | 354/64 |
| 4,113,137 | 9/1978 | Wind | 354/64 |

FOREIGN PATENT DOCUMENTS 2001287 7/1971 Fed. Rep. of Germany ............ 354/64

Primary Examiner—Howard Britton
Attorney, Agent, or Firm—John Cyril Malloy

[57] ABSTRACT

An underwater video camera housing is disclosed which is comprised of a cylindrical housing assembly including annular shoulders at both ends for reception of suitable gaskets such as O-rings for water-tight sealing engagement by respective front and back removable lenses, fixed in place by pluralities of latches. An inner camera support carriage for a video camera is slidably removably engaged in a chamber, defined within the housing, between the lenses. Suitable exterior controls for the video camera extend through the rear end lens as well as a single cable from the camera to a boat, for example, for viewing on a conventional television receiver or for connection to a video tape recording device. Space is provided within the housing chamber for a suitable battery pack and a pair of adjustable handles extend outwardly from a mid-length portion of the housing in a generally diametric relation.

16 Claims, 5 Drawing Figures

UNDERWATER VIDEO CAMERA HOUSING

BACKGROUND OF THE PRESENT INVENTION

A relatively few underwater types of video camera housings are currently being produced and those that are being produced are, in general, priced beyond the affordable range of the average person, particularly the amateur who is desirous of participating in the spectacular sport of recording underwater life and scenery.

Therefore, one of the principal objects of the present invention is to provide an underwater video camera housing in which all of the major components thereof are cut to size or shape from conventional, commercially available products such as PVC pipes, transparent synthetic sheet materials and water-tight fittings for exterior control means which extend inwardly for operable connection to a video camera, fixed within the housing.

A further object of the invention is to provide an underwater video camera housing which includes a pair of diametrically opposed handles, extending outwardly, generally from a mid-portion of the main housing member, and wherein the adjustable handles are formed from conventional commercially available products such as smaller diameter PVC pipes and fittings.

Yet another object of the present invention is to provide a very rugged, durable, relatively lightweight underwater video camera housing which may be produced at a fraction of the cost of other currently available devices of this nature.

DESCRIPTION OF A PREFERRED EMBODIMENT

Figure 1:
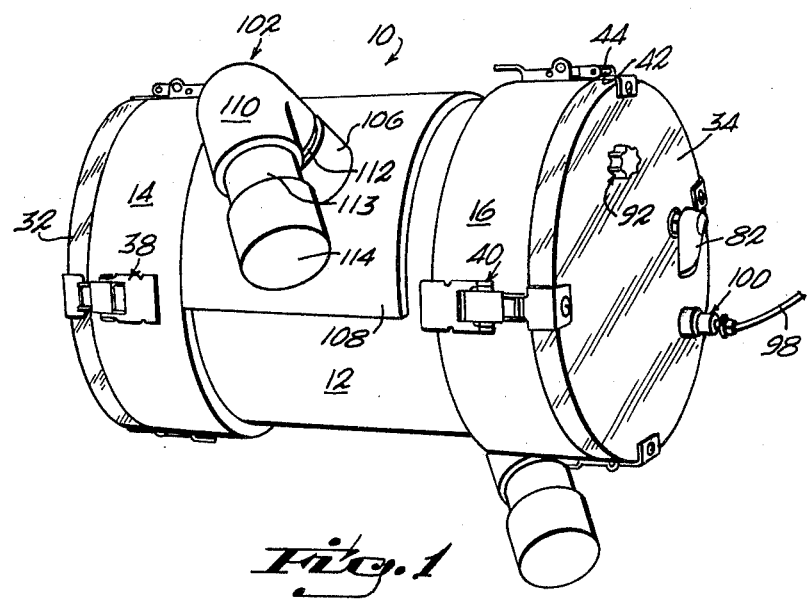
FIG. 1 is a perspective view of the underwater video camera housing of the present invention.
Figure 2:
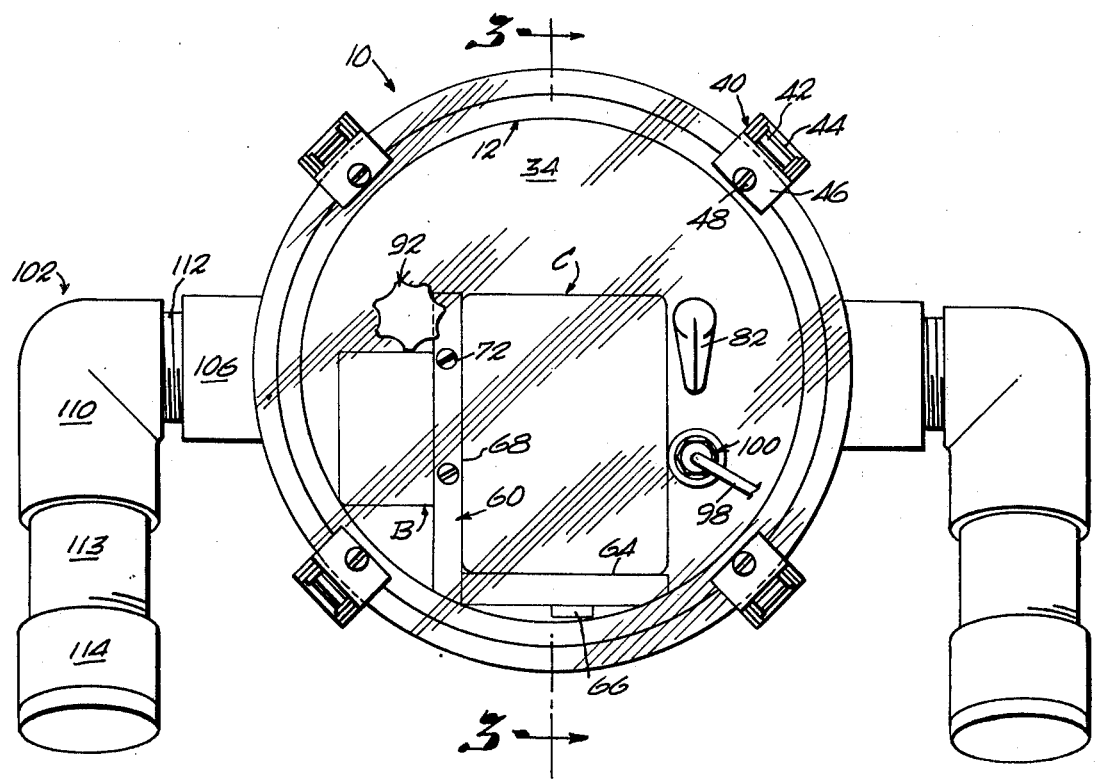
FIG. 2 is a rear end elevational view of the housing of FIG. 1.

Referring to the drawing and particularly to FIGS. 1 and 2, the underwater video camera housing of the present invention, indicated generally at 10, includes a main cylindrical body portion 12 of a predetermined length and diameter to house any of a number of commercially available video cameras C for conventional plug-in connection (not shown), to an appropriate battery pack B disposed, as illustrated, within housing 10.

Figure 3:
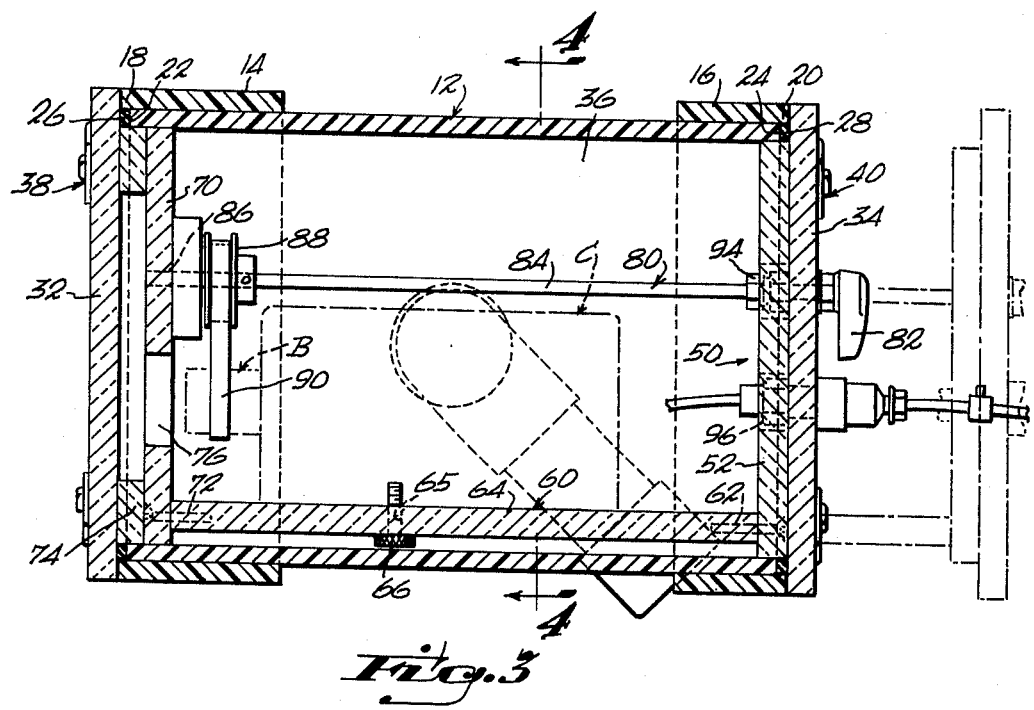
FIG. 3 is a longitudinal vertical sectional view thereof as seen along line 3—3 of FIG. 2.

In a preferred form, front and back end collars 14, 16 are secured by an appropriate adhesive material to the outer annular surface of the body portion 12, to provide slight oppositely outwardly projecting portions 18, 20, FIG. 3, to define inwardly extending peripheral recesses 22, 24 for reception of suitable gasket means such as the large O-rings 26, 28. In a preferred form of the invention, the main body portion 12 and front and back collars 14, 16 are simply cut to proper predetermined lengths from commercially available PVC tubings of proper predetermined diameters.

Front and back end lenses 32, 34, preferably formed from sheets of a suitable transparent synthetic material are secured in a water-tight engagement against the respective O-rings 26, 28 to seal the inner chamber 36 of the main body portion 12.

Lenses 32, 34 are secured against O-rings 26, 28 by respective pluralities of latches 38, 40, secured in a spaced relation about collars 14, 16, latches 38, 40 are preferably of a commercially available, double pivot type which includes a cross pin 42 for engagement in a hook 44 of a member including an angularly disposed plate portion 46 secured to a lens by screw means 48. The latching operations simultaneously draw the lenses 32, 34 inwardly to compress the O-rings 26, 28 to form a very secure seal for chamber 36.

A camera carriage, indicated generally at 50 includes a rear end secondary or inner lens portion 52 diametrically sized for slip fit within the rear end of body portion 12, and is preferably adhesively secured to the lens 34. In this manner, the lens 34 may be instantly properly positioned upon assembly to body portion 12. Obviously lens 34 and lens portion 52 may be formed from a single sheet of synthetic material and machined to accomplish the above described fit, however, for economy purposes, the above-described assembly is preferred.

Figure 4:
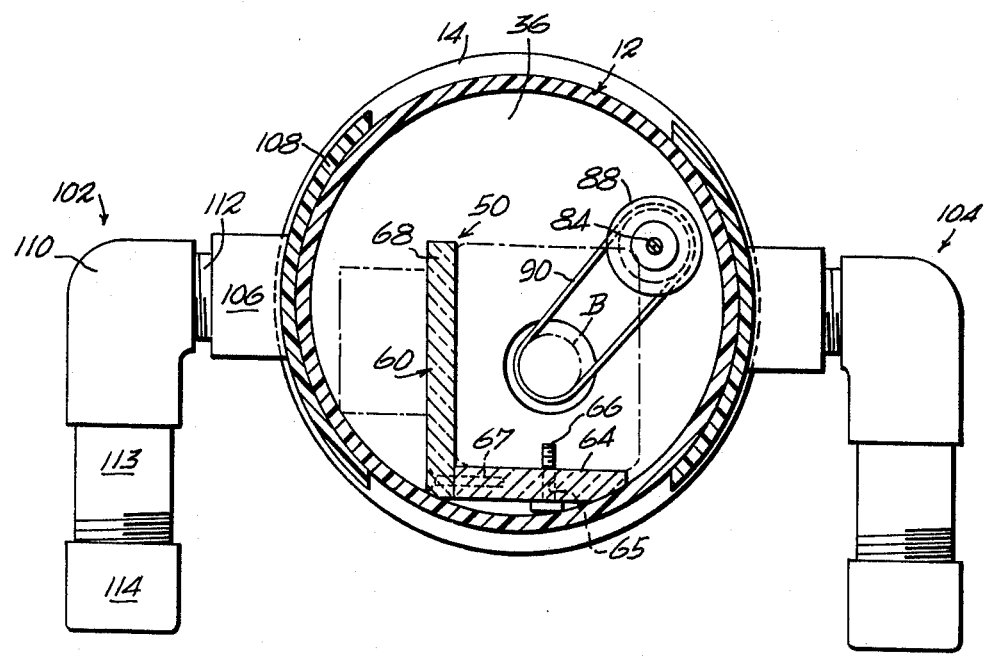
FIG. 4 is a vertical cross sectional view taken along line 4—4 of FIG. 3.

A longitudinally extending L-shaped camera support assembly 60 is secured in any conventional manner, such as by screws 62, to lens portion 52. A bottom plate 64 of assembly 60 includes a hole 65 positioned to receive a thumb screw 66 for threaded engagement in the camera C, and is attached as by screws 67, FIG. 4, to a vertical member 68.

A front annular plate 70, formed of the same transparent materials as lenses 32, 34 is fixed by suitable attachment means such as screws 72 to the L-shaped support assembly 60 which is of a predetermined length to position front plate 70 against or closely adjacent to an inner front lens portion 74, adhesively secured to front lens 32, and which may be in a ring form. Front plate 70 preferably includes a through hole 76, aligned with the normal position of the lens barrel B of video camera C and ring 74 is diametrically sized for slide-in reception in the front end of main body portion 12 to accurately position front lens 32.

Therefore, when the back lens 34 is unlatched and removed from the body portion 12, the camera carriage assembly 50, above described, being fixed relative to back lens 34 may be slid free of the chamber 36.

Appropriate camera control means 80 includes an exterior control knob or handle 82, fixed to a control rod 84 which extends inwardly through lens portions 34 and 52 in spanning relation to the length of camera carriage assembly 50 and is rotatably journaled at 86 relative to the front annular plate 70. A pulley 88 is fixed to control rod 84 and a belt 90 is engaged about pulley 88 and the camera lens barrel B as illustrated in FIG. 3 to, for example, adjust the lens aperature.

Some video cameras require only one adjustment control in operation, however, in FIGS. 1 and 2, a second control knob is indicated generally at 92, which may be appropriately connected to the camera if required. Appropriate commercially available water-tight fittings, indicated generally at 94, 96, are provided for the control means. A cable 98, connected to the video camera, extends through the back lens members 34, 52 by means of a conventional fitting as indicated generally at 100. Cable 98 transmits the picture to a video receiver or recorder, for example, disposed in a boat on the surface of the water, and includes an on-off switch 101.

Diametrically opposed handle assemblies 102, 104 are provided from a generally mid-portion of the body 12. Each assembly such as 102 includes an interiorly screw-threaded sleeve segment 106 secured as by a suitable adhesive to an arcuate plate 108 which is, in turn, similarly secured to one central side portion of the body 12. An Elbow 110 including an exteriorly projecting threaded first end 112 is threadably engaged in sleeve 106 and a short tubular arm 113 is secured as by adhesive means in a second end of elbow 110. A closure cap 114 is threaded onto the extended end of arm 112. Therefore, the handle assemblies are individually rotatably adjustable in generally parallel planes about a transverse axis through the sleeve segments 106. Alternatively, the sleeve segments 106 may be adhesively secured directly to the body 12.

In a preferred form, all of the above described handle elements are formed from conventional elements such as PVC pipes, tubes and fittings.

Figure 5:
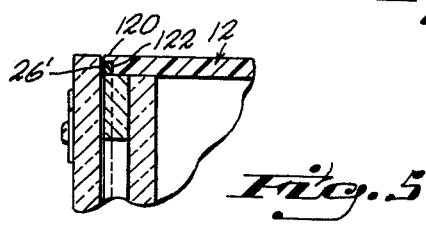
FIG. 5 is a fragmentary sectional view similar to the upper left corner of FIG. 3, illustrating a modified form of the housing.

FIG. 5 illustrates a slight modification in which the collars 14, 16 are omitted and the end edges such as 120 of the main body 12 are machined to define annular recesses such as 122 to seat the O-ring gaskets such as 26'.

While a preferred form of the invention has been herein illustrated and described, it will be obvious to those skilled in the art that various changes and modifications can be made therein without departing from the true spirit of the invention as defined in the appended claims.

What is claimed is:

1. An underwater video camera housing to receive a video camera for use in transmitting underwater pictures to a video receiver or video tape recorder device located in a remote area, such as on a boat, comprising,
    a main generally cylindrical body portion of a predetermined length and diameter and defining a generally cylindrical interior chamber, front and back removable lens means and latch means to secure said front and back lens means in a water-tight closed relation to respective normally open front and back ends of said cylindrical body portion; video camera support means fixed relative to an inside of said back lens means whereby said support means may be selectively positioned within said interior chamber or removed therefrom, said support means being sized for sliding movement into and out of said interior chamber;
    adjustable handle means fixed relative to an exterior surface of said cylindrical body portion, and video camera control means extending from control knob means exteriorly of said back lens through said back lens means, in a water-tight relation thereto, into said interior chamber for operable connection to the video camera.

2. The housing as defined in claim 1 including front and back collars of predetermined lengths, fixed exteriorly of respective front and back end portions of said body portion in a manner so as to provide slightly oppositely outwardly projecting portions of said collars respectively beyond said front and back ends to define annular recesses to receive respective gasket means, such as O-rings, for engagement by peripheral portions of said front and back lens means to define a water-tight seal for said interior chamber, when said front and back lenses are secured in place.

3. The housing as defined in claim 2 wherein said body portion and front and back collars are cut to said predetermined lengths from a commercially available tubing formed of a suitable material such as PVC.

4. The housing as defined in claim 1 wherein said lens means are formed from any appropriate type of transparent synthetic sheet material.

5. The housing as defined in claim 1 wherein said video camera support means comprises an L-shaped member including a bottom portion with a through hole for reception of appropriate screw means therethrough for engagement in an existing screw-threaded bottom hole in the video camera to secure said camera thereto.

6. The housing as defined in claim 5 wherein said support means includes a front end disc-shaped member fixed thereto and being sized for sliding engagement through said interior chamber, said disc-shaped member being formed of a suitable transparent synthetic material and including a hole formed therethrough in axial alignment with a lens barrel of the video camera.

7. The housing as defined in claim 6 wherein an upstanding portion of said L-shaped member defines a space within said interior chamber for a conventional battery pack for electrical connection to the video camera.

8. The housing as defined in claim 2 wherein said front and back lens means each include an outer lens portion of a diameter substantially equal to an outer diameter of said collars to define said water-tight seals, and an inner lens portion of a diameter for reception without said cylindrical body portion.

9. The housing as defined in claim 8 wherein said front inner lens portion is in the form of a peripheral ring.

10. The housing as defined in claim 1 wherein said handle means comprises a pair of handles adjustably mounted in a diametrically opposite relation to said cylindrical body.

11. The housing as defined in claim 10 wherein each of said handles includes a sleeve portion fixed in a radially extending relation to an exterior surface of said cylindrical body, an elbow having a first end in screw-threaded connection to said sleeve, and a second end, generally at right angles to said first end; a tube portion secured in said second end and extending a predetermined distance outwardly therefrom, and a closure cap secured to an extended end portion of said tube portion.

12. The housing as defined in claim 11 wherein each of said sleeve portion is secured as by an appropriate adhesive to an arcuate plate which is, in turn, adhesively secured to said exterior surface.

13. The housing as defined in claim 12 wherein said sleeve portions, elbows, tube portions, closure caps and arcuate plates are all formed of commercially available products of a suitable material such as PVC.

14. The housing as defined in claim 1 wherein said operable connection includes a control rod within said interior chamber connecting to said control knob means and having a pulley fixed thereto in an aligned relation to a lens barrel of the video camera, and a belt engaged around said pulley for engagement around the lens barrel.

15. The housing as defined in claim 1 including a video transmission cable extending through a water-tight fitting extending through said back lens means for plug-in connection to the video camera at a first end and having an outwardly extending portion to a second end for connection to a remotely located video receiver or video tape recorder device.

16. The housing as defined in claim 15 including an on-off switch, interposed in said cable outwardly of said back lens means.

* * * * *